United States Patent [19]
Salimando

[11] Patent Number: 5,561,704
[45] Date of Patent: Oct. 1, 1996

[54] PROXIMITY BASED TOLL FREE COMMUNICATION SERVICES

[75] Inventor: Steven C. Salimando, Little Silver, N.J.

[73] Assignee: AT&T Corp., Murray Hill, N.J.

[21] Appl. No.: 214,341

[22] Filed: Mar. 16, 1994

[51] Int. Cl.⁶ .............................. H04M 11/00; H04Q 7/22
[52] U.S. Cl. ................................. 379/58; 342/457
[58] Field of Search ..................... 379/58, 59, 201,
379/202, 213, 218; 455/186.1, 33.1, 54.1;
342/357

[56] References Cited

U.S. PATENT DOCUMENTS

| | | | |
|---|---|---|---|
| 4,964,156 | 10/1990 | Blair | 379/63 |
| 4,969,209 | 11/1990 | Schwob | 455/186.1 |
| 5,109,399 | 4/1992 | Thompson | 379/201 |
| 5,223,844 | 6/1993 | Mansell et al. | 342/357 |
| 5,339,352 | 8/1994 | Armstrong et al. | 379/58 |

*Primary Examiner*—Curtis Kuntz
*Assistant Examiner*—William G. Trost

[57] ABSTRACT

A caller in a mobile vehicle requiring service determines his location such as longitude and latitude and transmits his location and service requirements in numbers; by wireless mobile phone tone signals to a remote directory station containing a data base with the phone numbers, service classifications and locations of service providers in the area of the caller to derive the telephone number of a provider who is conveniently closest to the caller and connects the caller to the communication channel of the selected telephone number or advises the caller of the selected providers telephone number. The database is regularly updated by the addition and deletion of providers subscribing to the service.

20 Claims, 2 Drawing Sheets

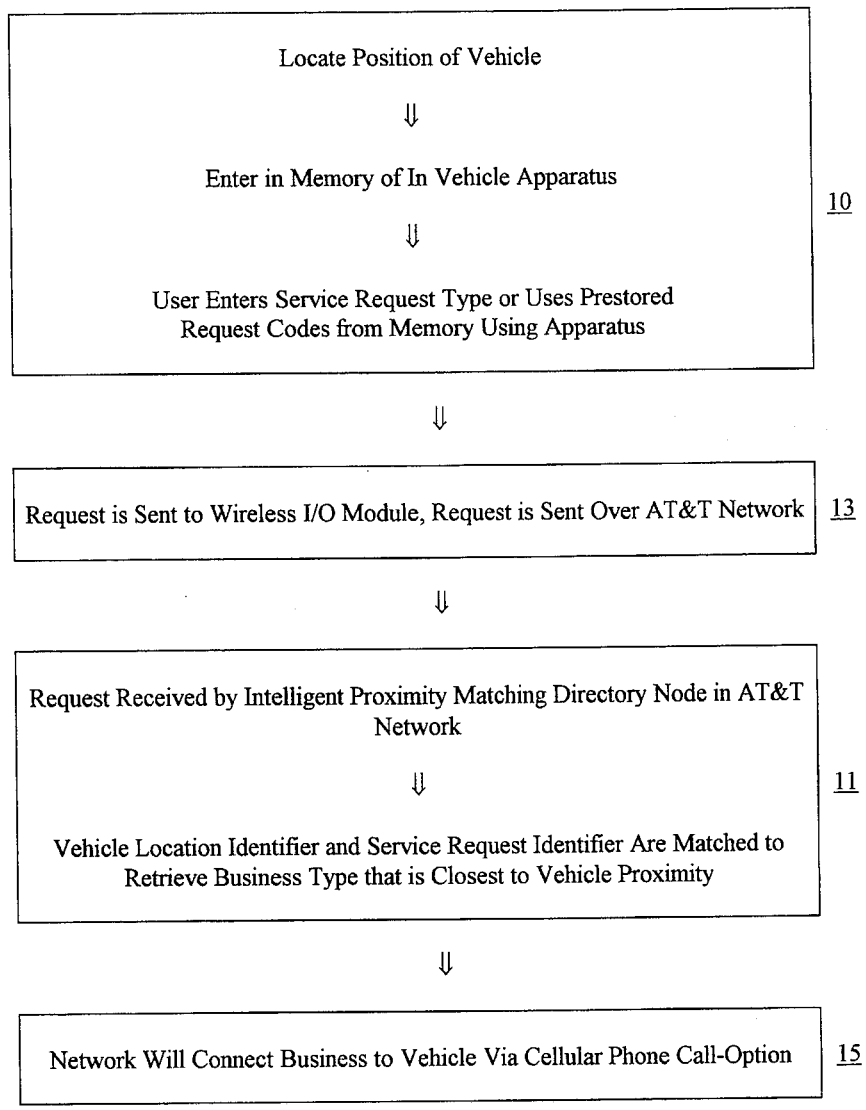

FIGURE 1

```
┌─────────────────────────────────────────────────────────────┐
│                                                             │
│                   Locate Position of Vehicle                │
│                                                             │
│                              ⇓                              │
│                                                             │
│              Enter in Memory of In Vehicle Apparatus        │     10
│                                                             │
│                              ⇓                              │
│                                                             │
│        User Enters Service Request Type or Uses Prestored   │
│           Request Codes from Memory Using Apparatus         │
│                                                             │
└─────────────────────────────────────────────────────────────┘

⇓

┌─────────────────────────────────────────────────────────────┐
│  Request is Sent to Wireless I/O Module, Request is Sent Over AT&T Network │   13
└─────────────────────────────────────────────────────────────┘

⇓

┌─────────────────────────────────────────────────────────────┐
│                                                             │
│   Request Received by Intelligent Proximity Matching Directory Node in AT&T │
│                            Network                          │
│                                                             │     11
│                              ⇓                              │
│                                                             │
│    Vehicle Location Identifier and Service Request Identifier Are Matched to │
│         Retrieve Business Type that is Closest to Vehicle Proximity │
│                                                             │
└─────────────────────────────────────────────────────────────┘

⇓

┌─────────────────────────────────────────────────────────────┐
│  Network Will Connect Business to Vehicle Via Cellular Phone Call-Option │   15
└─────────────────────────────────────────────────────────────┘
```

FIELD OF DATA BASE - CALLER

| LATITUDE | LONGITUDE | CALLER'S TELEPHONE NUMBER | SERVICE REQUEST AND TYPE | CALLER'S PAGER NUMBER |
|---|---|---|---|---|
| | | | | |

FIG. 2 (A)

FIELD OF DATA BASE - BUSINESS

| BUSINESS LOCATION IDENTIFIER | SERVICE REQUEST IDENTIFIER OR BUSINESS TYPE | TELEPHONE NUMBER OF BUSINESS |
|---|---|---|
| | | |

FIG. 2 (B)

DATA FIELD ENCODING

| | |
|---|---|
| TELEPHONE KEYPAD ENTRIES | ASSIGNED DATA |
| CUSTOMER'S TELEPHONE NUMBER | MOBILE USER'S LOCATION - LATITUDE AND LONGITUDE |
| PAGER NUMBER | CUSTOMER'S PAGER NUMBER |
| GAS | SERVICE REQUEST FOR GAS |
| FOOD | SERVICE REQUEST FOR FOOD |
| HELP | SERVICE REQUEST FOR ROAD-SIDE ASSISTANCE |
| DIRECTION | SERVICE REQUEST FOR TRAVEL DIRECTIONS |

FIG. 2 (C)

PROXIMITY BASED TOLL FREE COMMUNICATION SERVICES

BACKGROUND OF THE INVENTION

The present invention relates generally to improvements in the field of communication and it relates particularly to an improved method providing telephonic access by a caller to a proximate service provider.

A situation often experienced by a person or caller in a mobile vehicle is the need to obtain merchandise, assistance or aid promptly and in an unfamiliar area. For example, in the case of a breakdown or disabling of the vehicle, the person in need must select a most convenient and suitable provider of the required service and material but must advise him of his location and requirements. This under normal circumstances is, at best, difficult and highly time consuming. Even when the vehicle is provided with wireless communication, for example, a cellular phone, the problem still exists in locating the closest and most convenient provider, obtaining its telephone number and then telephoning him. It is clear that the present available procedures are difficult, time consuming and leave much to be desired.

SUMMARY OF THE INVENTION

It is a principal object of the present invention to provide an improved method of selecting and accessing a conveniently proximate provider of a required service.

Another object of the present invention is to provide an improved method of permitting a caller having a need to promptly access through a toll free telephone line a closely located provider capable of satisfying such need.

A further object of the present invention is to provide an improved method for providing to a caller requiring specified services direct telephone access or the telephone number of a provider of the required services proximate the caller, the accessible providers being subscribers, the list of subscribers being updated.

Still another object of the present invention is to provide an improved method of the above nature which employs conventional components and equipment, is convenient, reliable and simple to use and is of great versatility and adaptability.

The above and other objects of the present invention will become apparent from a reading of the following description taken in conjunction with the accompanying drawing which illustrates a preferred embodiment thereof.

In accordance with the method of the present invention a central or directory station includes a computer network provided with a memory or data base section storing the telephone numbers, locations of providers and the services or materials furnished by each provider and a processor network providing as an output a telephone number of a provider which satisfies the need and location inputted the network. A caller remote from the central station determines his location and transmits such location and his need or requirement to the central station either by wireless or cable, preferably by way of a toll free number, and the central station selects a matching or suitable provider and connects the caller by way of the telephone channel and computer outputted telephone number to the selected provider. The computer output preferably directly switches the caller to the selected provider.

The connection between the caller and the directory station selected provider is effected almost immediately and the: caller merely inputs the special directory number, his location and needs, all the input information conveniently being the generally available digit telephone tone signals. The directory station advantageously services a preselected area including the location of the caller and the database is regularly updated with the addition and deletion of subscribers.

BRIEF DESCRIPTION OF THE DRAWINGS

FIG. 1 is a flow chart illustrating a preferred embodiment of the method for establishing a communication channel between a mobile communications user and a business.

FIG. 2 is composed of FIGS. 2(A), 2(B) and 2(C) that respectively illustrate the field of data base—caller; field or data base—business; and data field encoding all of the method of the present invention.

DESCRIPTION OF THE PREFERRED EMBODIMENT

FIG. 1 shows a preferred embodiment of the method for establishing a communication channel between a business and a remote communications user (i.e. cellular telephone user) based upon the user's or caller's geographic location and personal preferences. The caller may select from a database whose fields are generally illustrated in Figure a(a), whereas the business database has fields generally illustrated in FIG. 2(B). The caller's choice of a particular business once the general type of business is selected is predetermined; i.e., the user selects a service station (see FIG. 2(A)), then the particular station is determined automatically by the user's geographical location. The particular business has an exchange telephone area (see FIG. 2(B)) surrounding it. If the user is within that geographical area when the call is made for that type of business, the user's call is directed t that business. In block 10, the remote user's geographic location (see latitude and longitude of FIG. 2(A)) is determined, for example, by triangulation or via the Global Positioning system (GPS). In addition, the remote user queries a provided database (see FIG. 2(C) for the data field encoding of user's queries by inputting the remote user's geographical location by means fo the telephone keypad (i.e. Vehicle Location Identifier corresponding to customer's telephone number (see FIG. 2(C)) and by manually inputting the remote user's preferences of classifications of goods or service (i.e. Service Request Identifier or Business Type (see FIG. 2(B)). In block 3, the user's input is sent to the database (see FIG. 2(B)) and an information processor via a communications network, which may include a wireless network and a public switched telephone network (i.e. AT&T Network).

In block 11, the database (see FIG. 2(B)), which was queried by the laser in block 10, has information that is optimally organized into the following fields (see FIG. 2(B)): (a) the geographic locations of businesses (i.e. Business Location Identifier), (b) classifications of the particular services or goods provided by the businesses (i.e. Service Request Identifier or Business Type), and (c) the corresponding telephone numbers of said businesses. An information processor coupled to the database retrieves the nearest respective phone number or telecommunications address, corresponding to the inputted geographic location as well as the classifications of goods or services.

In block 15, the remote user is automatically patched or connected to a communication channel associated with the phone number retrieved in block 11. Alternatively, the remote user is merely informed of the phone number in lieu of being automatically connected to a communications channel.

Referring now to the drawing which illustrates the flow diagram of the preferred embodiment of the present invention in which a mobile vehicle located caller having a wireless transceiver such as a cellular phone or the like and a temporary memory module, the reference numeral 10 generally designates the caller station, which possesses communication capability with a central or directory station 11 which in turn can communication couple caller station 10 with a directory selected provider station.

At the caller station 10 the caller determines the position of the vehicle he occupies, for example, its longitude and latitude in degrees and minutes, in any suitable manner, for example, by satellite, cellular triangulation or other suitable procedure and ascertains his need code which may be in a binary or numerical code. Such need may be for fuel, food, directions, auto repair or other service. This digital or binary coded location information, either directly or by way of a temporary memory is transmitted by cellular phone or other wireless communication channel 13 from caller station 10 to directory station 11, the channel being preferably a toll free channel, for example, an 800 number. The information may be transmitted by tone signals.

Directory station 11 includes a data base and a data processing retrieval network. The data base is loaded with the telephone numbers of service providers within a predetermined area together with the location of the respective providers and their service classification, by number. The caller transmitted data of location and requested service is inputted into the retrieval network which outputs the telephone number of a provider of the specified classification and at a location as close as available to the caller's location. Also located in the directory station is a telephone switching network which responds to the retrieval network output to connect the caller to the provider. The telephone number output of the retrieval network may be converted by a voice-synthesizer to produce a voice signal which signal is transmitted to the caller from the directory central station communication channel to the caller. The data base is continuously or regularly updated by the addition or deletion of service providers within the area covered by the directory station, the service providers advantageously being charged subscribers to the service.

As a specific example of the improved method a caller in a stalled automobile requiring auto repair service determines his latitude and longitude in degrees and minutes by satellite location and stores such information as two three digit numbers in a RAM or temporary caller memory. Also inputted into the caller memory is a two digit number designating auto repair service requirement. The caller then rings the directory station by cellular phone and a special toll free directory station number and upon receiving voice instructions successively touch tone transmits from the caller memory the caller's longitude, latitude and service requirement number. The directory station network processes the caller fed information and retrieves the phone number of an auto repair provider in the close proximity of the caller and so advises or connects the caller directly to the processor derived telephone number line where the caller can explain his location and problem to the selected provider.

In accordance with another example of the improved method a user or caller who wishes to buy food and is traveling on an interstate highway determines his latitude and longitude in the manner described and code stores it in a temporary memory in addition to the code classification of his food purchasing requirement. He then calls the toll free number of the directory station by wireless telephone and activates the caller memory network to transmit the stored data by way of the toll free line to the central directory station. The directory station includes an updatable data base containing the telephone numbers, service classifications and the locations of subscriber providers of services and their allocated service areas. The directory station retrieves from the data base the subscriber provider (merchant) possessing the area rights which include the caller's location and providing the requested services (food) and the telephone number of the selected provider. The central station then telephone transmits through the caller's transmission channel and telephone number information retrieved from the data base relating to the selected provider including its telephone number and other desirable information and/or may directly connect the caller to the selected provider. The cost for the service including the registering of the information in the data base relating to the provider is billed to the respective providers and may be allocated in accordance with prescribed charges.

It should be noted that the individual components of the apparatus employed in the present improved process and their individual functions, per se, are known and conventional.

While there have been described preferred embodiments of the present invention it is apparent that numerous alterations, omissions, and additions may be made without departing from the spirit thereof.

I claim:

1. A method for establishing a communications channel between a mobile communications user and a public telecommunications system user, wherein said public telecommunications system user is a business, said method comprising the steps of:

a) providing a database containing a directory of businesses, which use a public communications system, including fields regarding business geographic locations of said businesses, classifications of goods or services offered by said businesses, and corresponding telecommunications addresses of said businesses;

b) transmitting information, including a mobile user's geographic location and a mobile user's preference for goods or services, or a mobile user's preference for both goods and services, to an information processor and to the database provided in step a;

c) comparing the information transmitted in step b to the information contained in the database to select a particular one of said businesses which furnishes the mobile user's preferences for goods or services; comparing the business geographic location with the mobile user's geographic location to select the proximate one of said businesses which is located within a predetermined maximum range from the mobile user's geographic location; and d) retrieving the telecommunications address of the business selected by the comparison in step c.

2. The method according to claim 1 further comprising the step of:

e) determining the mobile user's location of said mobile user prior to transmitting information in step b.

3. The method according to claim 2 wherein the step of determining the location of the mobile user is accomplished by using a location system selected from the group of the Global Positioning System (GPS), a satellite triangulation location system, and a cellular triangulation location system.

4. The method according to claim 2 wherein step a, providing a database, is accomplished by specifying business geographic locations in terms of latitude and longitude; wherein the step e, determining the location of the mobile user, is determined in terms of latitude and longitude.

5. The method according to claim 1 wherein step b, transmitting information, further comprises the step of encoding mobile user's geographic location into tone signals for transmission over the public switched telephone network.

6. The method according to claim 5 wherein step b, transmitting information, further comprises encoding the mobile user's geographic location information into a six digit dual-tone, multiple-frequency code and encoding the mobile user's preferences for goods and services into a two digit dual-tone, multiple-frequency code.

7. The method according to claim 1 wherein step b, transmitting, is accomplished by the mobile user transmitting the information via a communications device selected from the group consisting of a cellular phone and a mobile phone.

8. The method according to claim 1 further comprising the step of:
   e) storing the information regarding the mobile user's geographic location and the mobile user's preferences in memory at the mobile user's geographic location prior to transmitting said information in accordance with step b.

9. The method according to claim 1 further comprising the step of:
   e) connecting the mobile communications user to the particular one of said businesses by using the telecommunications address retrieved in step d to establish a communications channel.

10. The method according to claim 9 wherein step e, connecting, is accomplished via the combination of a wireless communication channel and a landline communication channel.

11. A method for providing a mobile communication user with information on businesses that are accessed via a public switched telephone network, said method comprising the steps of:
   a) providing a database containing a directory of businesses, which use a public communications system, including fields regarding business geographic locations of said businesses, classifications of goods or services offered by said businesses, and corresponding telephone numbers of said businesses;
   b) transmitting information, including a mobile user's geographic location and a mobile user's preference for goods or services, or both goods and services, to an information processor and to the database provided in step a;
   c) comparing the information transmitted in step b to the information contained in the database to select the business furnishing the mobile user's preferences for goods or services and comparing the business geographic location with the mobile user's geographic location to select the business which is located within a predetermined maximum range from the mobile user's geographic location;
   d) retrieving the telephone number of the business selected by the comparison in step c; and
   e) informing the mobile user of the telephone number retrieved in step d.

12. The method according to claim 11 further comprising the step of:
   f) determining the mobile user's location of said mobile user prior to transmitting information in step b.

13. The method according to claim 12 wherein determining the location of the mobile user is accomplished by using a location system selected from the group of the Global Positioning System (GPS), a satellite triangulation location system, a cellular triangulation location system.

14. The method according to claim 12 wherein step a, providing a database, is accomplished by specifying business geographic locations in terms of latitude and longitude; wherein the step f, determining the mobile user's location of said mobile user, is determined in terms of latitude and longitude.

15. The method according to claim 11 wherein step b, transmitting the information, further comprising the step of encoding mobile user's geographic location into tone signals for transmission over the public switched telephone network.

16. The method according to claim 15 wherein step b, transmitting the information, further comprises encoding the mobile geographic user's location information into a six digit dual-tone, multiple-frequency code and encoding the mobile user's preferences for goods and services into a two digit dual-tone, multiple-frequency code.

17. The method according to claim 11 wherein step b, transmitting, is accomplished by the mobile user transmitting the information via a cellular phone.

18. The method according to claim 11 wherein step b, transmitting, is accomplished by the mobile user transmitting the information via a mobile phone.

19. The method according to claim 11 further comprising the step of storing the information regarding the mobile user's geographic location and the mobile user's preferences in memory at the mobile user's geographic location prior to transmitting said information in accordance with step b.

20. The method according to claim 11 wherein step e, informing, is accomplished by transmitting an audio signal via a public switched telephone network.

* * * * *